United States Patent Office 3,338,120
Patented Aug. 29, 1967

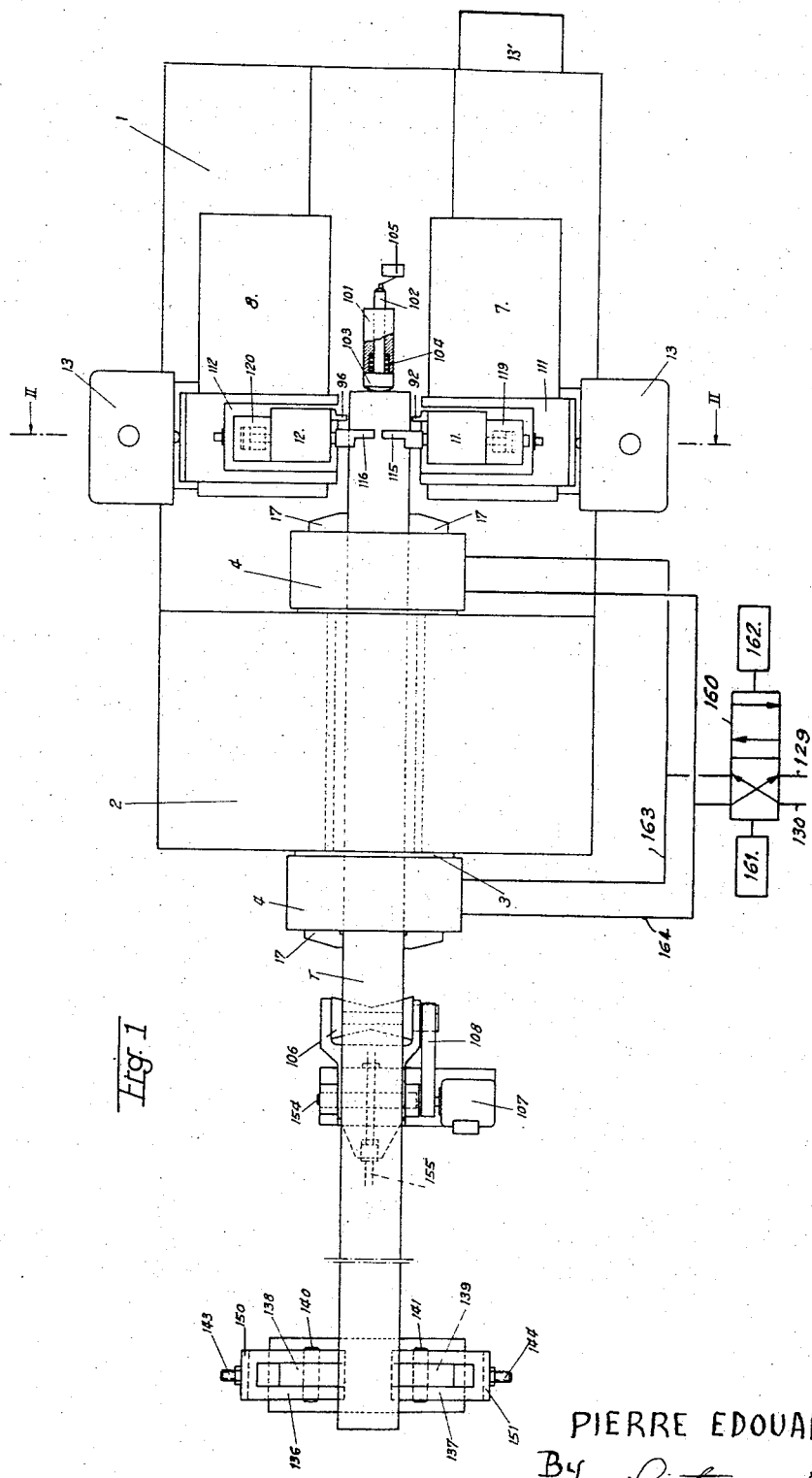

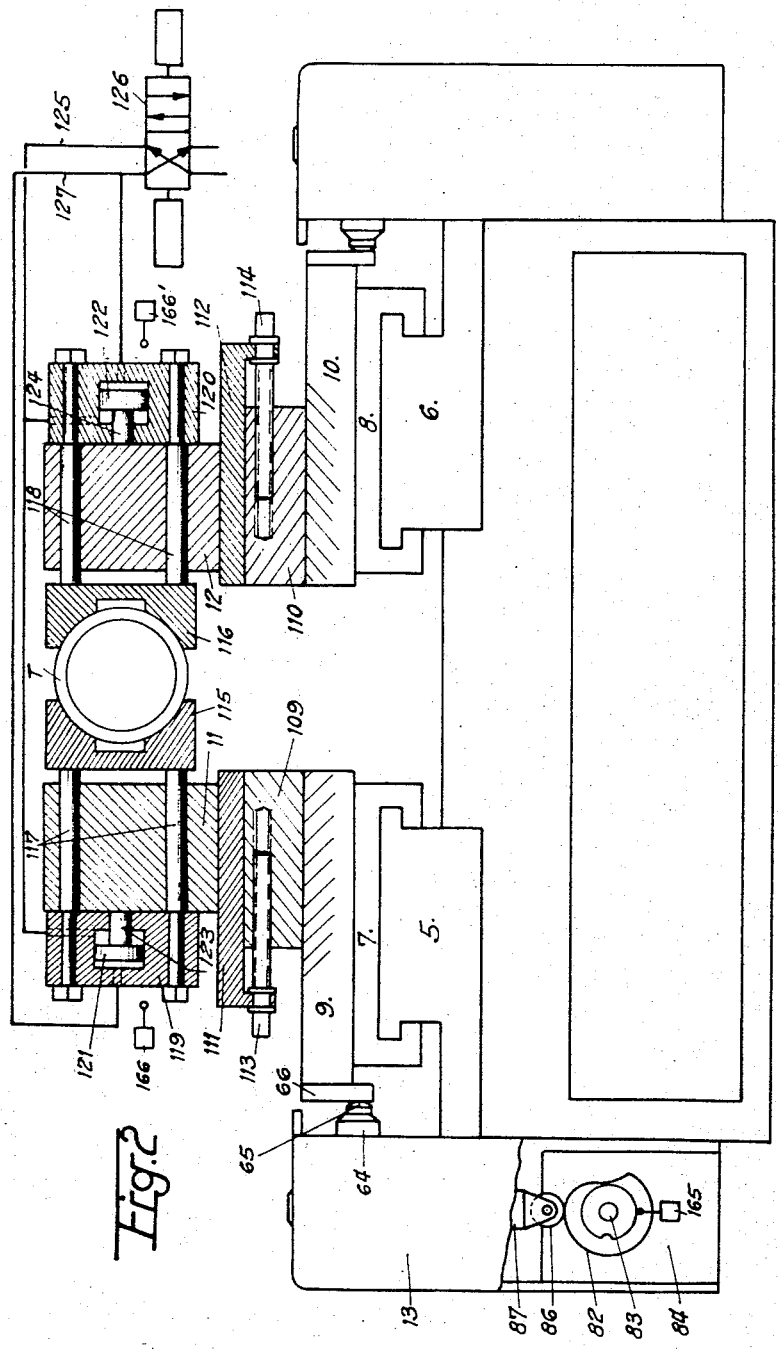

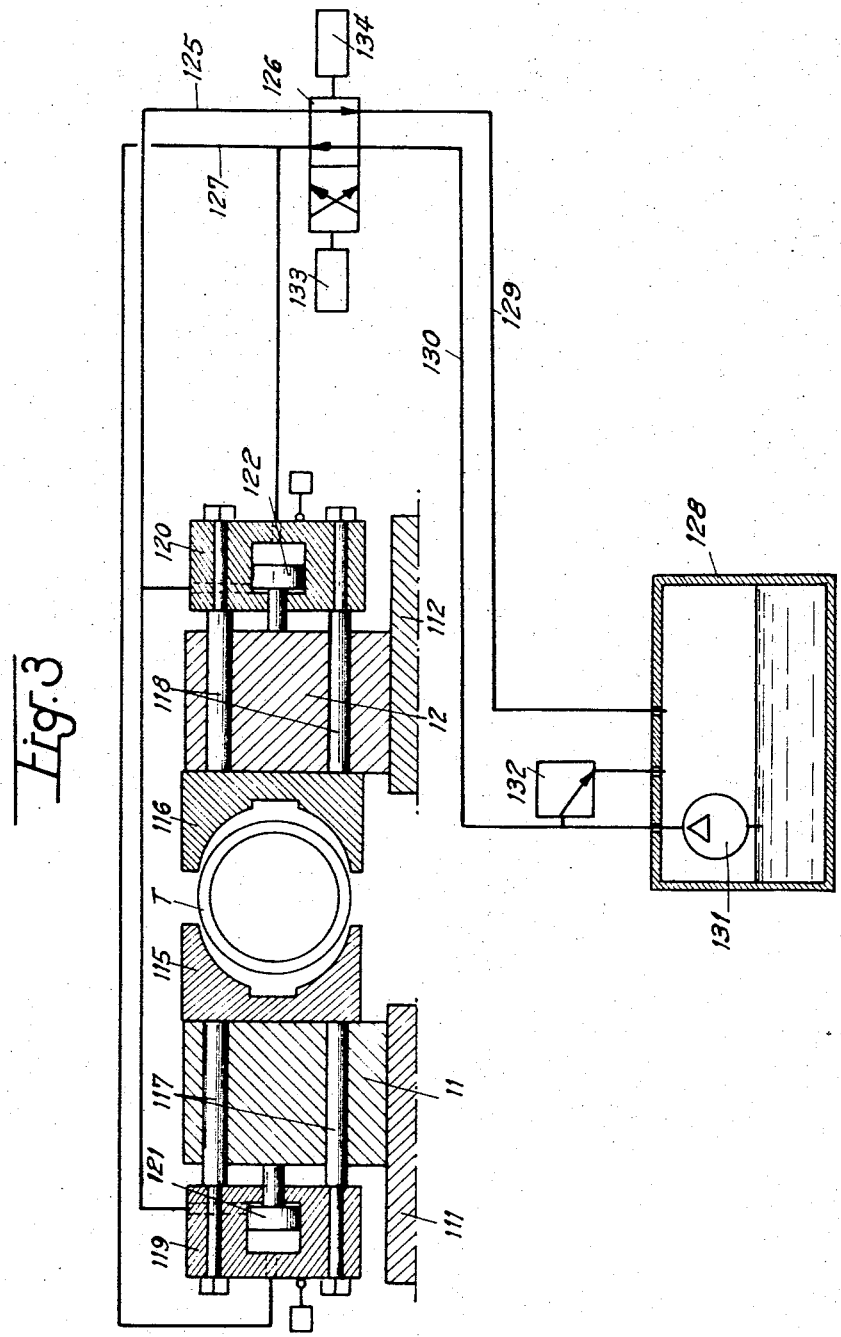

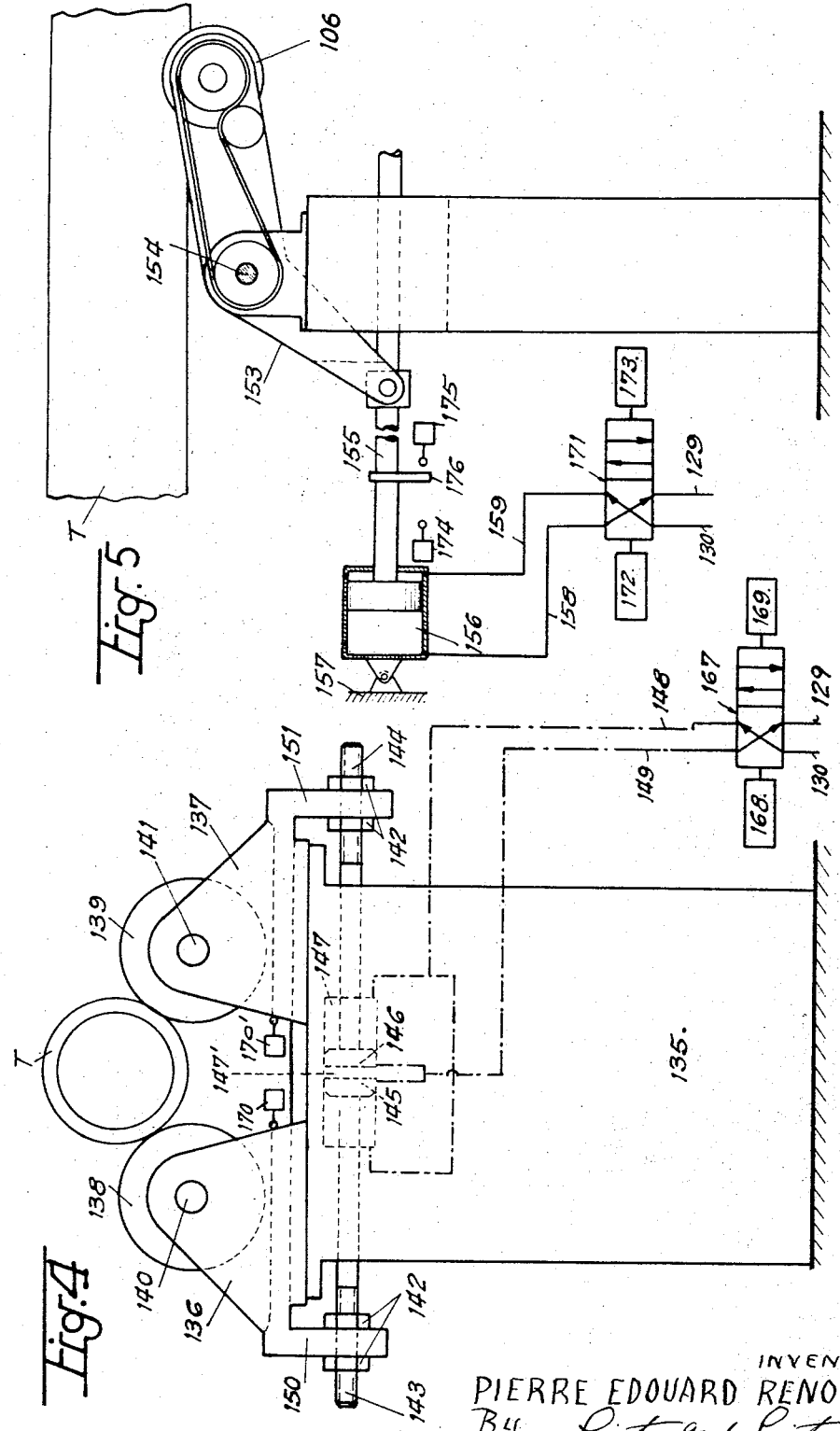

3,338,120
THREAD CUTTING MACHINE
Pierre Edouard Renoux, Colombes, France, assignor to Cri-Dan, Paris, France, a corporation of France
Filed Apr. 15, 1965, Ser. No. 448,432
Claims priority, application France, Apr. 28, 1964, 972,609, Patent 85,664
10 Claims. (Cl. 82—5)

ABSTRACT OF THE DISCLOSURE

The present application is an improvement upon the thread cutting machine of U.S. Patent No. 3,169,426 for effecting a centering of the external surface of the zone of tubing to be worked upon on such a machine irrespective of the distance from said zone of tubing to the head chuck of the machine and without requiring manual intervention to correct the centering or to extend the automatic working cycle of the machine.

In U.S. Patent No. 3,169,426 of February 16, 1965, the present applicant described a thread-cutting machine equipped with cutting tools of a general type similar to screw-cutting lathes. Said machine consisted of a frame carrying a headstock fitted with a spindle through which the tube to be machined is permitted to pass so as to be clamped by two chucks and then driven in rotation by motors. The machine further consisted of two tool-holder carriage units mounted symmetrically on two slideways fixed to the frame parallel to the axis of the spindle. Said two carriage units can be controlled mechanically and at will in one or a number of motion cycles either from the spindle and simultaneously or independently of each other, or alternatively by means of an auxiliary motor for the purpose of carrying out in the first case turning and threading operations and, in the second case, down-feed or cutting-off operations.

By virtue of a machine of this type, it is possible to cut off a badly calibrated length of tube, to turn the tube if necessary after chamfering, then to carry out the internal or external thread-cutting of the new end thus formed, and finally even to perform a shaving operation.

A machine of this type is therefore of unquestionable economic advantage since it replaces two or even three other types of conventional machines and consequently permits of high hourly production rates with excellent efficiency, and further requires minimum floor-space and minimum labor.

However, the present applicant has found that a difficulty remains at the beginning of an operation when it is necessary to center the tube exactly in coincidence with the geometrical axis of the machine. In fact, the tube is fed to the machine through the spindle which then clamps the tube when a sufficient length has been passed through. In practice, however, tubes are not geometrically perfect. Since the zone of the tube in which this latter is gripped in the head chuck of the machine is in any case necessarily located at a certain distance from the zone to be worked, it follows as a result that the tube can be perfectly centered in said chuck whereas the portion to be machined can be out of center when the tube rotates in the machine on account of imperfect straightness of the tube.

It is in that case necessary for the operator of the machine to correct the centering by hand by adjusting each jaw of the chuck separately. This operation takes a long time relatively to the time of automatic operation and consequently increases the cost price of the entire machining operation.

It has already been proposed to carry out the automatic centering of tube ends by fitting a tube end around a concentric expandable mandrel which is carried by a tailstock and which is coaxial with the spindle of the headstock. In this case, the chuck or chucks of the headstock are of the so-called floating or compensating type wherein the jaws effect the clamping irrespective of the position of the tube, within certain limits, relatively to the axis of rotation. A mandrel of this type forms the subject of French Patent No. 1,057,656 in the name of Cri-Dan, as filed on 4th June, 1952.

An appreciable result is obtained by this method from the point of view of centering of the tube end. However, the interior of the tube is centered and not the exterior, so that any inequalities in thickness of wall result in a displacement off-center at the outer surface which is in most cases the surface to be worked.

Moreover, it is not feasible in such a case to cut off a substantial length of tubing on the machine since this would make it necessary to lengthen the expandable mandrel to an equal extent which would thus make said mandrel too fragile.

The precise object of the present invention is to improve upon the machine disclosed in U.S. Patent No. 3,169,426 in such a manner as to effect a centering of the external surface of the zone of tubing to be worked irrespective of the distance from said zone to the chuck and without requiring any manual intervention or extension of the automatic work cycle.

To this end, a machine in accordance with the present invention is essentially characterized in that it is provided on the two transverse carriages thereof with two symmetrical centering jaws designed to take up an active centering position and a withdrawn position, means being provided for placing the jaws in the active position thereof as and when the tube reaches the work position then for thrusting back said jaws into the withdrawn position thereof after the movement of controlled members for bringing the transverse carriages towards each other has been stopped as a result of the clamping of the tube between the jaws, and means being additionally provided for effecting the clamping of the chucks when the tube is gripped by the jaws and finally for initiating the work cycle.

Although the use of independent auxiliary controlled members can be contemplated for moving the transverse carriages towards each other, it has proved of particular advantage, in the usual case in which the work cycle of the machine begins with a cutting-off operation, to make use of existing down-feed or cutting-off cams and more especially the first portion of the slow-feed slope of said cams for the purpose of performing the function of controlled members.

The machine in accordance with U.S. Patent No. 3,169,426 is fitted with two associated down-feed or cutting-off cams which are driven by a common reduction-gear motor and which effect the symmetrical movements of the transverse carriages, in particular for the first cutting-off operation performed on the tube which has just been advanced.

The first portion or slow-feed portion of the slope of each cam is therefore employed in order to carry out the centering of the tube in the work zone at the beginning of the cycle and prior to clamping of the chucks by virtue of two jaws which withdraw after having performed their function so as to permit the cutting-off operation which is controlled by the second portion of the cam-slope. In the meantime, the movement of the two cams has of course stopped as a result of the centering itself and this short dead time is turned to useful account by clamping the centered tube in the chucks.

In a preferred form of embodiment of this invention, each transverse carriage carries a transversely adjustable sole-plate and a block mounted thereon which is fitted externally with a double-acting hydraulic cylinder and a piston inside said cylinder, said piston being integral with said block and designed to control guided transverse columns which pass through the block and which carry one of the adjusting jaws.

By virtue of the above-described arrangement, it is possible after adjustment of the sole-plates to set the jaws in the active position with a high degree of precision as a result of the abutting contact of each cylinder against the outer face of the block.

As a preferred feature, the two hydraulic cylinders are controlled in parallel by an electrovalve which ensures the setting of the jaws in the active position at the commencement of each cycle and the return to the withdrawn position after clamping of the tube by the chucks.

Finally, the following sequence of operations is therefore obtained: at the beginning of a cycle, the setting of the jaws in the active position by means of the electrovalve which may if necessary be controlled by a stop with which the extremity of the tube comes into contact, the transverse feed motion of the cross-slides or transverse carriages as produced by the cutting-off cams, then the arresting of said transverse feed motion by gripping of the tube between the chucks and finally, the clamping of the tube by the chucks followed by the movement of the centering jaws to the withdrawn position thereof by means of the electrovalve, which thus initiates the movement of rotation of the main spindle of the machine and again starts up the transverse feed motion of the cross-slides, thereby automatically initiating the commencement of the cutting-off operation.

In accordance with yet another improvement, means are provided for centering that portion of the tube which is located farthest away from the work zone either prior to or during the clamping action of the chucks on said tube.

If it is required, for example, to machine a tube of large diameter which therefore has a low degree of flexibility, the above-mentioned means can consist of a shaft-bearing cradle which is designed to support the above-mentioned tube end in the active position and which is placed in this active position prior to clamping of the tube by the chucks. On the other hand, if the tube to be machined has a degree of flexibility which is not negligible, the above-mentioned means can consist of the chuck which is located farthest away from the work zone and which is in that case of concentric design.

In the first case, the cradle can usefully consist of two longitudinal rollers carried by symmetrical bearing-brackets which are caused to move transversely on a common frame between a withdrawn position and an adjustable active position, the control operation being carried out by means of a double jack.

Finally, in accordance with a further improvement, if the machine is provided with rollers for feeding the tube, means are provided for retracting said rollers when the tube is centered or clamped and for returning said rollers to the active position at the end of the cycle.

In practice, a single link-rod which is actuated in the longitudinal direction by a jack can produce for this purpose the swinging motion of articulated levers which support the above-mentioned tube-feeding rollers.

A clear understanding of the invention will in any case be gained from the description which follows below, reference being made to the accompanying drawings which are given solely by way of example and not in any limiting sense, and in which:

FIG. 1 is an overhead view of a machine in accordance with U.S. Patent No. 3,169,426 and comprising the improvements which form the subject of the present invention;

FIG. 2 is a sectional view taken along line II—II of FIG. 1;

FIG. 3 is a similar partial view showing the members in another position;

FIG. 4 is a view in elevation showing the cradle which is intended to support the upstream end of a tube;

FIG. 5 is a side view of one of the devices which comprise the rollers for feeding tubes, the motor having been omitted from the figure.

Figure 6:
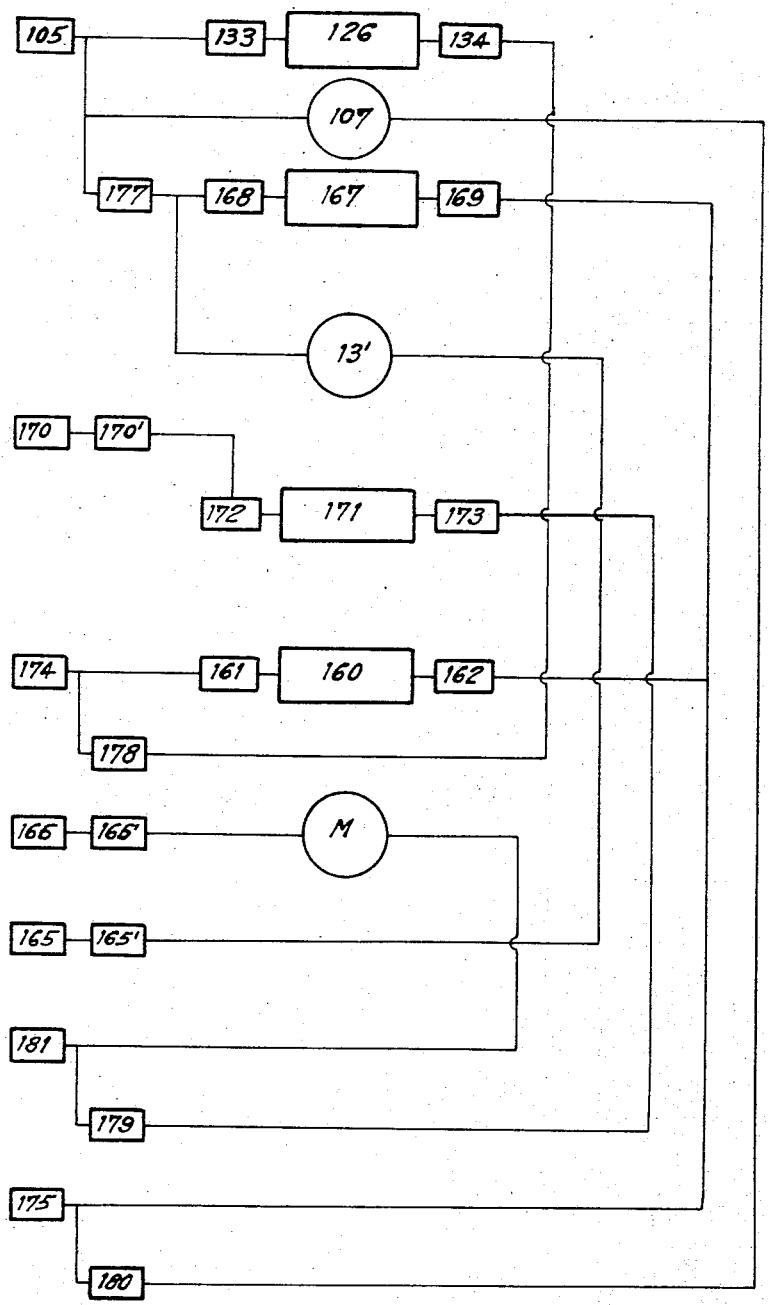
FIG. 6 is a diagram which illustrates the work cycle of the machine.

There is shown more especially in FIGS. 1, 2 and 3 a machine according to U.S. Patent No. 3,169,426 and which therefore comprises a frame 1, a headstock 2 and a spindle 3 which is driven in rotation together with its two chucks 4, the upstream and downstream clamping jaws of which are shown at 17, from a motor M which is shown in FIG. 6. The frame is also provided with two slideways 5 and 6 on which are mounted the lengthwise carriages 7 and 8 on which are in turn mounted the transverse carriages 9 and 10.

On each side of the machine are located the auxiliary frames 13 which are illustrated in detail in FIG. 4 of U.S. Patent No. 3,169,426 and which each contain in particular a cutting-off cam 82, see present FIG. 2, the shaft 83 of which extends from a casing 84 in which are housed the means for transmitting motion between the shaft 83 and a wheel which is driven in its turn with its symmetry by a motor 13' which is again shown in FIG. 1 and in FIG. 6. There will be noted in addition the presence of two switches 165 and 165' which are each controlled by a cut-out portion of a disc which is integral with each cam 82.

In order to gain a clear understanding of the specific description, the movement of rotation of each cam 82 is transmitted by a roller 86 to a push-rod 87 and that this latter initiates by means of motion transmission systems illustrated in FIG. 4 of U.S. Patent No. 3,169,426 the horizontal movements for controlling the transverse carriage through the intermediary of a rod 64 carrying at its extremity a roller 65 which produces action on a rule or flat rail 66 which is integral with the corresponding transverse carriage.

In this manner, the end of a tube such as the tube T which is fed in from the upstream end of the machine, namely from the left-hand side of FIG. 1, is thus cut off by means of the tools 92 and 96. When said tube is in position, it produces action on a retractable stop 101, the rod 102 of which is thrust back by the head 103 in opposition to a spring 104, with the result that said rod comes into contact with a switch 105 and actuates the means for clamping the two chucks 4. The work cycle according to U.S. Patent No. 3,169,426 is thus initiated, and then continues for the operations involving thread-cutting, turning and shaving with which the present description is not directly concerned. The means for clamping the two chucks 4 are also represented diagrammatically in FIGS. 1 and 6 in the form of an electrovalve 160 with its two electromagnets 161 and 162, the complete assembly being intended to supply fluid from branch-pipes of the conduits 129 and 130 of FIG. 3 either to the conduit 163 through which the clamping of the chucks is effected or to the conduit 164 which serves to slacken off said chucks, which is the case represented in the drawings.

The tube is preferably fed in known manner from the upstream end through a series of devices fitted with waisted rollers 106 which are driven from a motor 107 by means of a driving belt 108 with tensioning roller, the retractable stop 102 being designed to stop the rotation of the motors 107.

As has been stated above, it can happen that the beginning of the work cycle which takes place in the manner described in U.S. Patent No. 3,169,426 is disturbed as a result of faulty centering of the tube T. As a result, it can prove necessary to stop the machine for a long period and the time which is lost in this manner is highly prejudicial, particularly in view of the fact that the amortization of machines of the type employed calls for a high rate of production.

The arrangements which will now be described have for their object to prevent such losses of time.

The tool-holder units 11 and 12, which are mounted on the transverse carriages 9 and 10 with interposition of a stationary block 109 and 110 and a block 111 or 112 which is adjustable in known manner by means of screws 113 or 114, each carry a jaw 115 or 116. Said jaws are mounted on two pairs of superposed rods 117 or 118 which are adapted to slide within corresponding bores of the toolholders and which are integral respectively with a cylinder 119 and 120, there being fitted within said cylinders pistons which are respectively designated by the references 121 and 122 and which are keyed respectively on rods 123, 124, said rods being each made integral with the corresponding tool-holder.

The internal chambers of the two cylinders are connected by means of a common pipe 125 to a distribution slide-valve 126 at which there also terminate pipes 127 through which the outer chambers of the cylinders are supplied.

As shown in FIG. 3, the distribution slide-valve 126 connects the pipes 125 and 127 to a fluid supply tank 128 by means of a return pipe 129 and to a supply pipe 130 comprising a pump 131 and a by-pass 132.

The electromagnets 133, 134 make it possible to place the distributor 126 either in the position shown in FIG. 2, in which the inner chambers are supplied with fluid under pressure through the pipes 130 and 125 while the outer chambers are in communication with the return through the pipes 127 and 129, or in the position shown in FIG. 3 wherein the outer chambers are supplied with fluid under pressure through the pipes 130 and 127, the inner chambers being of course connected to the supply tank via the pipes 125 and 129.

It can therefore be visualized that the arrangements which are shown make it possible either to thrust back the jaws towards a tube T, as shown in FIG. 2, until the cylinder 119 comes into abutment with the tool-holder 11 and the cylinder 120 comes into abutment with the tool-holder 12 or, on the contrary, to retract the jaws as shown in FIG. 3 until the outer faces thereof come into abutment with the two tool-holders 11 and 12 and, in this position, produce action on two switches 166 and 166'.

It will further be noted in reference to FIG. 1 that the jaws 115 and 116 are disposed on the tool-holder upstream of the cutting-off tools and very exactly between the two sets of tools shown in FIGS. 8, 9 and 10 of U.S. Patent No. 3,169,426.

The unit which is thus described is completed by a cradle which is designed to carry the upstream end of the tube T in the position shown in FIG. 1.

Said cradle essentially comprises on a frame 135 two bearing-brackets 136, 137 which each carry a roller 138 or 139 having a longitudinal axis.

FIG. 4 clearly shows that the distance between the shafts 140 and 141 of the two rollers can be regulated by means of the bolts such as the bolt 142 in conjunction with the two rods 143, 144 which are threaded at the ends thereof, this being effected in a position in which the heads 145 and 146 of the two rods mentioned earlier are in abutting contact with a central partition wall 147'.

The arms 150 and 151 which are integral with the bearing-brackets 136, 137 having thus been clamped between the nuts 142, the distance between the shafts 140 and 141 at which the tube T is perfectly centered with respect to the longitudinal axis of the machine will thus have been determined.

In order to advance and withdraw the cradle transversely to the axis of the tube, it will now be necessary only to introduce fluid under pressure into the cylinder 147, either externally of the two piston-heads 145, 146 through the pipes 148 or between said two heads through the pipe 149. This is obtained by virtue of an electrovalve 167 of the type previously mentioned, said electrovalve being supplied through the conduits 129 and 130 and controlled by the electromagnets 168 and 169.

There is thus obtained a symmetrical sliding motion of the two bearing-brackets 136 and 137 along their slideway 152, with the result that the cradle is either withdrawn or put into the operative position in which said cradle comes into contact with and closes two switches 170 and 170'.

Finally, it will be noted that the practical application of the improvements according to the present invention makes use of the fact that the bearing-bracket 153 which carries each of the waisted rollers 106 is pivotally mounted at 154 on the corresponding frame and is operated by a link-rod which also produces action on all the link-rods 153 of all the similar assemblies which are provided. Said link-rod is operated in turn by a hydraulic jack 156 which is illustrated diagrammatically in FIG. 5. Said hydraulic jack is stationarily mounted at 157 and thus capable of putting the waisted rollers either in the operative position or in the withdrawn position by virtue of the pipes 158 and 159.

The pipes 158 and 159 are again supplied through the pipes 129 and 130 with interposition of an electrovalve 171 which is controlled by two electromagnets 172 and 173. The end positions of the waisted rollers are indicated by two switches 174 and 175 which are closed by abutting contact with a stop 176.

The operation of the machine as hereinbefore defined in reference to the drawings will now be described. Accordingly, reference will be made to FIGURE 6 which shows the different control systems referred-to in the foregoing, as well as four timing devices 177, 178, 179 and 180 and an end-of-cycle switch 181 which can be operated by any element of the machine when the work cycle on a particular tube is completed.

At the beginning of a cycle, the motors 107 feed by means of the waisted rollers a tube T which therefore comes into contact with the retractable stop 103 and this latter produces action on the switch 105 which is shown at the top of FIG. 6.

The switch 105 first produces action directly on the electromagnet 133 and on the motors 107 which it thus brings to a standstill. The electromagnet 133 places the electrovalve 126 in the operative position in accordance with FIG. 2 and, in this position, the two jaws 115 and 116 are moved towards each other by the fluid which circulates within the pipe 125.

The switch 105 also produces action, after a certain time-lag produced by the timing device 177, both on the electromagnet 168 and on the motor 13' which is accordingly started up. The electromagnet 168 places the electrovalve 167 in the position which is shown in FIG. 4 and the outer chambers of the cylinder 147 are thus supplied by said electrovalve through the pipe 148. The rollers 138 and 139 are therefore brought into the position shown wherein they support the tube T.

Moreover, the bearing-brackets 136 and 137 operate the two switches 170 and 170' which, in their turn, and as again shown in FIG. 6, energize the electromagnet 172 so as to place the electrovalve in the position shown in FIG. 5 wherein the pipe 159 supplies the jack 156 so as to exert a tractive effort on the rod 155 and withdraw the waisted rollers 106.

However, the motor 13' has previously been started up. As a result, the two transverse carriages 9 and 10 have slowly moved towards each other under the action of the cams 82 and more particularly under the action of the gradually sloping portions of said cams. The tube T is, therefore, gripped and perfectly centered by the jaws 115 and 116 and the motor 13' is arrested.

Finally, when the waisted rollers 106 are withdrawn, the tube remains gripped between the jaws 115 and 116 at the downstream end and is carried by the rollers 138 and 139 at the upstream end. Perfect centering of the tube T has thus been achieved and, when the stop 176 operates the switch 174, as shown in FIG. 5, this latter can accordingly energize the electromagnet 161 and place the electrovalve 160 in the position shown in FIG. 1, wherein the pipe 163 produces the clamping of the chucks 4.

The switch 174 further produces action, with interposition of a timing device 178 which allows the necessary time for the clamping of the chucks to take place, on the electromagnet 134 which places the electrovalve 126 in the position which ensures the withdrawal of the jaws 115 and 116 by means of the pipe 127. The machine is thus located in a position in which the work cycle proper can start and, in addition, the motor 13' which carries out the cutting-off operation by means of the cam 82 is released by the withdrawal of the jaws themselves and resumes its movement of rotation. During the transverse approach movement which results therefrom and before the cutting-off tools 92 and 96 reach the tube, the switches 166 and 166' which have been closed by the abutting contact of the cylinders 119 and 120 have started up the main motor M of the machine which has had the time to run up to normal speed and therefore to drive the tube T in rotation at the requisite speed. The work cycle proper takes place in accordance with U.S. Patent No. 3,169,426 and will, therefore, not be described in this context. It will only be noted that, at the beginning of a cycle, the switches 165 and 165' have stopped the cutting-off motor 13' on completion of the cutting-off operation, as shown in FIG. 6.

It will be apparent that the end-of-cycle switch 181 stops the motor M. Said switch also energizes the electromagnet 173 by means of the timing device 179 which permits the positional locking of the tube T and said electromagnet places the electrovalve 171 so that this latter ensures the return of the waisted rollers 106 to the operative position by virtue of the pipe 158. This operation produces action on the switch 175 which in turn energizes the electromagnets 162 and 169, with the result that the electromagnet 162 releases the chucks and the electromagnet 169 withdraws the rollers 138 and 139. The tube T is then supported only by the waisted rollers and the timing device 180 starts up the motor 107 once again in the direction which causes the tube to withdraw.

After the tube has withdrawn, the members are located in the position which permits a further operation as soon as the motors 107, after stopping thereof and removal of the tube, have been started up again in the desired direction, a fresh tube having been placed on the waisted rollers.

As will also be readily apparent, this invention is not limited in any sense to the form of embodiment which has been described and illustrated but can be extended to include a large number of modifications without thereby departing either from the scope or the spirit of the invention.

In particular, and although the use of cams 82 for effecting the movement which results in the gripping of the tube by the jaws appears to be particularly advantageous and economical since other additional means are thereby dispensed with, it is clear that it would not constitute a departure from the scope of this invention if provision were made, for example, for a separate set of two symmetrical cams together with any drive systems and motors which may be associated therewith in order to produce this movement.

What I claim is:

1. Thread-cutting machine equipped with cutting tools and comprising a frame carrying a headstock fitted with a spindle through which the tube to be machined is permitted to pass so as to be clamped by two chucks and rotatably driven by a motor, two tool-holder carriage units which are mounted symmetrically on two slideways secured to said frame and which are disposed parallel to the axis of said spindle, wherein said two carriage units can be controlled mechanically and at will in one or a number of motion cycles either from the spindle and simultaneously or independently of each other or by means of an auxiliary motor for the purpose of carrying out in the first case turning and thread-cutting operations and in the second case down-feed or cutting-off operations, wherein said machine is provided on the two transverse carriages thereof with two symmetrical centering jaws designed to take up an active centering position and a withdrawn position, means being provided for placing the jaws in the active position thereof as and when the tube reaches the work position then for thrusting back said jaws into the withdrawn position thereof as soon as the movement of controlled members for bringing the transverse carriages towards each other has been stopped as a result of the gripping of the tube between the jaws, and means being additionally provided for producing the clamping action of the chucks when the tube is gripped by the jaws and then finally for initiating the work cycle.

2. Machine as claimed in claim 1, wherein the controlled members which move the transverse carriages towards each other consist of existing down-feed or cutting-off cams and more precisely of the first portion of the slow-feed slope of said cams.

3. Machine as claimed in claim 1, wherein each transverse carriage carries a transversely adjustable sole-plate and a block mounted thereon which is fitted externally with a double-acting hydraulic cylinder and a piston inside said cylinder, said piston being integral with said block and designed to control guided transverse columns which pass through the block and which carry one of the adjusting jaws.

4. Machine as claimed in claim 1, wherein each transverse carriage carries a transversely adjustable sole-plate and a block mounted thereon which is fitted externally with a double-acting hydraulic cylinder and a piston inside said cylinder, said piston being integral with said block and designed to control guided transverse columns which pass through the block and which carry one of the adjusting jaws, the two hydraulic cylinders being controlled in parallel by means of an electrovalve which ensures the setting of the jaws in the active position thereof at the commencement of each cycle and the return of said jaws to the withdrawn position thereof after clamping of the tube by the chucks.

5. Thread-cutting machine of a type similar to thread-cutting lathes and comprising a frame carrying a headstock fitted with a spindle through which the tube to be machined is permitted to pass so as to be clamped by two chucks and rotatably driven by a motor, two tool-holder carriage units which are mounted symmetrically on two slideways secured to said frame and which are disposed parallel to the axis of said spindle, wherein said two carriage units can be controlled mechanically and at will in one or a number of motion cycles either from the spindle and simultaneously or independently of each other or by means of an auxiliary motor for the purpose of carrying out in the first case turning and thread-cutting operations and in the second case down-feed or cutting-off operations, wherein said machine is provided on the two transverse carriages thereof with two symmetrical centering jaws designed to take up an active centering position and a withdrawn position, means being provided for placing the jaws in the active position thereof as and when the tube reaches the work position then for thrusting back said jaws into the withdrawn position thereof as soon as the movement of controlled members for bringing the transverse carriages towards each other has been stopped as a result of the gripping of the tube between the jaws, and means being additionally provided for producing the clamping action of the chucks when the tube is gripped by the jaws and then finally for initiating the work cycle, further means being provided for centering that portion of the tube which is located farthest away from the work zone either before said tube is clamped by the chucks or during the clamping thereof.

6. Machine as claimed in claim 5, wherein the centering means consist of a shaft-bearing cradle which is designed to support said tube end in the active position and which is placed in this active position prior to clamping of the tube by the chucks.

7. Machine as claimed in claim 5, wherein the centering means consist of the chuck which is located farthest away from the work zone and which is in that case of concentric design.

8. Thread-cutting machine of a type similar to thread-cutting lathes and comprising a frame carrying a headstock fitted with a spindle through which the tube to be machined is permitted to pass so as to be clamped by two chucks and rotatably driven by a motor, two tool-holder carriage units which are mounted symmetrically on two slideways secured to said frame and which are disposed parallel to the axis of said spindle, wherein said two carriage units can be controlled mechanically and at will in one or a number of motion cycles either from the spindle and simultaneously or independently of each other or by means of an auxiliary motor for the purpose of carrying out in the first case turning and thread-cutting operations and in the second case down-feed or cutting-off operations, wherein said machine is provided on the two transverse carriages thereof with two symmetrical centering jaws designed to take up an active centering position and a withdrawn position, means being provided for placing the jaws in the active position thereof as and when the tube reaches the work position then for thrusting back said jaws into the withdrawn position thereof as soon as the movement of controlled members for bringing the transverse carriages towards each other has been stopped as a result of the gripping of the tube between the jaws, and means being additionally provided for producing the clamping action of the chucks when the tube is gripped by the jaws and then finally for initiating the work cycle, further means being provided for centering that portion of the tube which is located farthest away from the work zone either before said tube is clamped by the chucks or during the clamping thereof, said means consisting of a shaft-bearing cradle which is designed to support said tube end in the active position thereof and which is placed in this active position prior to clamping of the tube by the chucks, said cradle comprising two longitudinal rollers carried by symmetrical bearing-brackets which are driven in transverse motion on a common frame between a withdrawn position and an adjustable active position, the driving operation being effected by a double jack.

9. Machine as claimed in claim 5 comprising rollers for feeding the tube and means for retracting said rollers when the centering means are put in the active position and conversely.

10. Thread-cutting machine of a type similar to thread-cutting lathes and comprising a frame carrying a headstock fitted with a spindle through which the tube to be machined is permitted to pass so as to be clamped by two chucks and rotatably driven by a motor, two tool-holder carriage units which are mounted symetrically on two slideways secured to said frame and which are disposed parallel to the axis of said spindle, wherein said two carriage units can be controlled mechanically and at will in one or a number of motion cycles either from the spindle and simultaneously or independently of each other or by means of an auxiliary motor for the purpose of carrying out in the first case turning and thread-cutting operations and in the second case down-feed or cutting-off operations, wherein said machine is provided on the two transverse carriages thereof with two symmetrical centering jaws designed to take up an active centering position and a withdrawn position, means being provided for placing the jaws in the active position thereof as and when the tube reaches the work position then for thrusting back said jaws into the withdrawn position thereof as soon as the movement of controlled members for bringing the transverse carriages towards each other has been stopped as a result of the gripping of the tube between the jaws, and means being additionally provided for producing the clamping action of the chucks when the tube is gripped by the jaws and then finally for initiating the work cycle, further means being provided for centering that portion of the tube which is located farthest away from the work zone either before said tube is clamped by the chucks or during the clamping thereof, said means consisting of a shaft-bearing cradle which is designed to support said tube end in the active position thereof and which is placed in this active position prior to clamping of the tube by the chucks, said cradle comprising two longitudinal rollers carried by symmetrical bearing-brackets which are driven in transverse motion on a common frame between a withdrawn position and an adjustable active position, the driving operation being effected by a double jack, the machine being additionally provided with rollers for feeding the tube together with means for retracting said rollers when the centering means are put in the active position thereof and conversely.

No references cited.

HARRISON L. HINSON, *Primary Examiner.*